US010655451B2

(12) United States Patent
Ahmad et al.

(10) Patent No.: US 10,655,451 B2
(45) Date of Patent: May 19, 2020

(54) METHODS AND SYSTEMS EMPLOYING A GRADIENT SENSOR ARRANGEMENT FOR RANGING

(71) Applicant: Halliburton Energy Services, Inc., Houston, TX (US)

(72) Inventors: Akram Ahmadi Kalateh Ahmad, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 94 days.

(21) Appl. No.: 15/776,741

(22) PCT Filed: Jan. 22, 2016

(86) PCT No.: PCT/US2016/014615
§ 371 (c)(1),
(2) Date: May 16, 2018

(87) PCT Pub. No.: WO2017/127117
PCT Pub. Date: Jul. 27, 2017

(65) Prior Publication Data
US 2018/0328165 A1 Nov. 15, 2018

(51) Int. Cl.
*E21B 7/04* (2006.01)
*E21B 47/0228* (2012.01)
(Continued)

(52) U.S. Cl.
CPC .......... *E21B 47/02216* (2013.01); *E21B 7/06* (2013.01); *E21B 43/305* (2013.01);
(Continued)

(58) Field of Classification Search
CPC ............................ E21B 7/04; E21B 47/02216
See application file for complete search history.

(56) References Cited

U.S. PATENT DOCUMENTS

| 5,589,775 A | 12/1996 | Kuckes | |
|---|---|---|---|
| 5,923,170 A * | 7/1999 | Kuckes | E21B 47/02216 175/45 |

(Continued)

FOREIGN PATENT DOCUMENTS

| WO | 2014-089505 | 6/2014 |
|---|---|---|
| WO | 2014089402 | 6/2014 |

OTHER PUBLICATIONS

International Search Report and Written Opinion for PCT/US2016/014615 dated Sep. 12, 2018.
(Continued)

*Primary Examiner* — Kenneth L Thompson
(74) *Attorney, Agent, or Firm* — Jason Sedano; C. Tumey Law Group PLLC (57) ABSTRACT

A system includes a gradient sensor arrangement deployed in a first borehole, the gradient sensor arrangement having a plurality of spaced sensors at a single measured depth position. The system also includes an electromagnetic (EM) transmitter deployed in a second borehole. The system also includes a processor configured to determine a distance or direction of the EM transmitter relative to the gradient sensor arrangement based on EM field measurements collected by the gradient sensor arrangement in response to an EM field emitted by the EM transmitter. The system also includes a directional drilling controller configured to update a trajectory for either the first borehole or the second borehole in response to the determined distance or direction.

20 Claims, 5 Drawing Sheets

(51) Int. Cl.
  *E21B 47/022* (2012.01)
  *G01V 3/18* (2006.01)
  *E21B 43/30* (2006.01)
  *E21B 47/09* (2012.01)
  *G01V 3/28* (2006.01)
  *E21B 7/06* (2006.01)
  *E21B 47/024* (2006.01)
  *G01V 3/26* (2006.01)
  *E21B 43/24* (2006.01)

(52) U.S. Cl.
  CPC ........ *E21B 47/024* (2013.01); *E21B 47/0905* (2013.01); *G01V 3/18* (2013.01); *G01V 3/26* (2013.01); *G01V 3/28* (2013.01); *E21B 43/2406* (2013.01)

(56) References Cited

U.S. PATENT DOCUMENTS

| | | | | |
|---|---|---|---|---|
| RE36,569 E | * | 2/2000 | Kuckes | E21B 47/02216 175/45 |
| 8,307,915 B2 | * | 11/2012 | Clark | E21B 41/0035 166/245 |
| 8,952,700 B2 | * | 2/2015 | Wisler | E21B 47/02216 175/45 |
| 9,932,818 B2 | * | 4/2018 | Hay | E21B 7/04 |
| 10,113,414 B2 | * | 10/2018 | Clark | E21B 47/02216 |
| 2007/0278008 A1 | | 12/2007 | Kuckes et al. | |
| 2009/0030615 A1 | * | 1/2009 | Clark | E21B 47/02216 702/7 |
| 2009/0201025 A1 | | 8/2009 | McElhinney | |
| 2011/0121835 A1 | | 5/2011 | Brune et al. | |
| 2011/0187373 A1 | * | 8/2011 | Wisler | G01V 3/00 324/338 |
| 2011/0298462 A1 | * | 12/2011 | Clark | E21B 47/024 324/346 |
| 2011/0308794 A1 | | 12/2011 | Bittar et al. | |

OTHER PUBLICATIONS

A.F. Kuckes, R.T. Hay, J. McMahon, A.G. Nord, D.A. Schilling, and J. Morden, "New electromagnetic surveying/ranging method for drilling parallel horizontal twin wells," SPE Drilling & Completion, 1996.

"Triaxial Induction Applications in Difficult and Unconventional Formations" Wang et al. 2012.

* cited by examiner

METHODS AND SYSTEMS EMPLOYING A GRADIENT SENSOR ARRANGEMENT FOR RANGING

BACKGROUND

The world depends on hydrocarbons to solve many of its energy needs. Consequently, oil field operators strive to produce and sell hydrocarbons as efficiently as possible. Much of the easily obtainable oil has already been produced, so new techniques are being developed to extract less accessible hydrocarbons. One such technique is steam-assisted gravity drainage ("SAGD") as described in U.S. Pat. No. 6,257,334, "Steam-Assisted Gravity Drainage Heavy Oil Recovery Process". SAGD uses a pair of vertically-spaced, horizontal wells less than about 10 meters apart.

In operation, the upper well is used to inject steam into the formation. The steam heats the heavy oil, thereby increasing its mobility. The warm oil (and condensed steam) drains into the lower well and flows to the surface. A throttling technique is used to keep the lower well fully immersed in liquid, thereby "trapping" the steam in the formation. If the liquid level falls too low, the steam flows directly from the upper well to the lower well, reducing the heating efficiency and inhibiting production of the heavy oil. Such a direct flow (termed a "short circuit") greatly reduces the pressure gradient that drives fluid into the lower well.

Short circuit vulnerability can be reduced by carefully maintaining the inter-well spacing, i.e., by making the wells as parallel as possible. (Points where the inter-well spacing is smaller than average provide lower resistance to short circuit flows.) In the absence of precision drilling techniques, drillers are forced to employ larger inter-well spacings than would otherwise be desirable, so as to reduce the effects of inter-well spacing variations. Precision placement of neighboring wells is also important in other applications, such as collision avoidance, infill drilling, observation well placement, coal bed methane degasification, and wellbore intersections. Unfortunately, the ranging operations needed to achieve precision placement of neighboring wells are costly and time-consuming.

BRIEF DESCRIPTION OF THE DRAWINGS

Accordingly, there are disclosed in the drawings and the following description methods and systems employing a gradient sensor arrangement for ranging. In the drawings.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are methods and systems employing a gradient sensor arrangement for ranging. As used herein, the term "gradient sensor arrangement" refers to a plurality of spaced sensors (e.g., with a symmetrical or non-symmetrical radial spacing relative to an axis) at a single measured depth position. The spaced sensors may correspond to, for example, magnetometers. The gradient sensor arrangement enables an electromagnetic (EM) field gradient relative to an EM transmitter to be determined for the single measured depth position. The EM field can be generated by an EM transmitter in a nearby well. In some embodiments, the gradient sensor arrangement is deployed in the well being drilled (e.g., as part of a bottomhole assembly or "BHA"). In such case, the EM transmitter is deployed in a nearby target well (e.g., as part of a tool deployed via wireline, slickline, or coiled tubing). In other embodiments, the EM transmitter is deployed in the well being drilled (e.g., as part of a BHA) and the gradient sensor arrangement is deployed in a nearby target well (e.g., as part of a tool deployed via wireline, slickline, or coiled tubing). The gradient EM field measurements collected by the gradient sensor arrangement are processed to determine the distance and/or direction between the EM transmitter and the gradient sensor arrangement (or a related point of reference). As needed, directional drilling operations for the well being drilled can be updated based on the determined distance and/or direction information.

In at least some embodiments, an example system includes a gradient sensor arrangement deployed in a first borehole, the gradient sensor arrangement having a plurality of spaced sensors at a single measured depth position. The system also includes an EM transmitter deployed in a second borehole. The system also includes a processor configured to determine a distance or direction of the EM transmitter relative to the gradient sensor arrangement based on EM field measurements collected by the gradient sensor arrangement in response to an EM field emitted by the EM transmitter. The system also includes a directional drilling controller configured to update a trajectory for either the first borehole or the second borehole in response to the determined distance or direction. Meanwhile, in at least some embodiments, an example method includes deploying a gradient sensor arrangement in a first borehole, the gradient sensor arrangement having a plurality of spaced sensors at a single measured depth position. The method also includes deploying an EM transmitter in a second borehole. The method also includes determining a distance or direction of the EM transmitter relative to the gradient sensor arrangement based on EM field measurements collected by the gradient sensor arrangement in response to an EM field emitted by the EM transmitter. The method also includes updating a trajectory for either the first borehole or the second borehole in response to the determined distance or direction. Various component deployment options, gradient sensor arrangement options, gradient EM field measurement processing options, and other ranging options are described herein.

Figure 1:
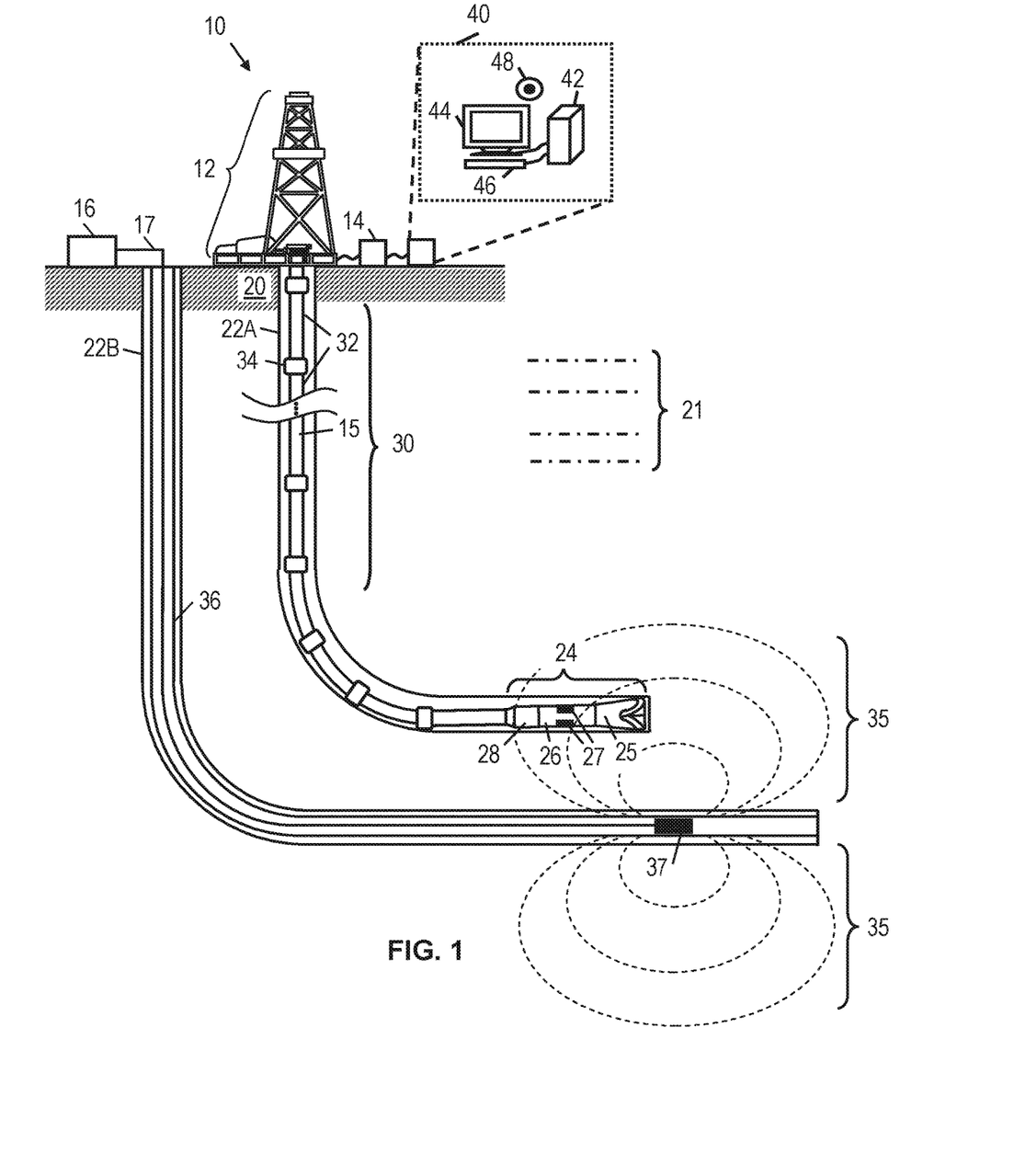
FIG. 1 is a schematic diagram showing an illustrative ranging scenario.

FIG. 1 shows an illustrative ranging scenario. In FIG. 1, a drilling assembly 12 enables a drillstring 30 to be lowered and raised in a borehole 22A that penetrates formations 21 of the earth 20. The drillstring 30 includes a plurality of drillstring segments 32 joined by collars or adaptors 34. At the lower end of the drillstring 30, a bottomhole assembly 24 (BHA) with a drill bit 25 removes material and penetrates the formations 21 using known drilling techniques. The BHA 24 may include, for example, thick-walled tubulars called drill collars, which add weight and rigidity to aid the drilling process. The thick walls of these drill collars make them useful for housing instrumentation and/or sensors. In at least some embodiments, the BHA 24 includes a gradient EM measurement tool 26 with a plurality of EM sensors 27. The BHA 24 may also include a telemetry/control unit 28. In at least some embodiments, the EM sensors 27 are positioned such that the EM sensors 27 are at the same measured depth position and are offset radially (e.g., spaced on opposite sides of an axis). Further, the EM sensors 27 may have the same orientation (or at least have a known orientation relative to each other). Regardless of the number, spacing, and/or orientation of the EM sensors 27, their operation is to collect gradient EM field measurements in response to an EM field 35 emitted by an EM transmitter 37 deployed in another borehole 22B via wireline, slickline, or coiled tubing. In at least some embodiments, the borehole 22B corresponds to a completed well (e.g., with casing string 36) or other target well for the borehole 22A being drilled. In some embodiments, the EM transmitter 37 is powered by a power supply 16 and a transmission line 27 that extends between earth's surface and the EM transmitter 37 (e.g., as part of a wireline). Alternatively, the EM transmitter 37 may be powered by a local power source such as a battery or fuel cells (e.g., in a slickline or coiled tubing scenario).

Once gradient EM field measurements are collected by the gradient EM measurement tool 26, these gradient EM field measurements can be stored and processed downhole (e.g., by electronics of the BHA 24). Additionally or alternatively, collected gradient EM field measurements can be conveyed to earth's surface via telemetry/control unit 28 for storage and processing. In either case, the gradient EM field measurements may be processed to determine a distance and/or direction between the gradient EM measurement tool 26 (or particular sensors) and the EM transmitter 37. Further, directional drilling operations can be performed based on the determined distance and/or direction as described herein.

As an example, an interface 14 at earth's surface may receive gradient EM field measurements or other survey data from the BHA 24 via known telemetry techniques such as mud pulse telemetry, acoustic telemetry, EM telemetry, or a wired connection. In some embodiments, the surface interface 14 and/or a computer system 40 may perform various operations such as converting received signals from one format to another, storing gradient EM field measurements, processing gradient EM field measurements, deriving distance and/or direction logs from the gradient EM field measurements, displaying derived logs, displaying directional drilling messages/alerts, generating directional drilling commands, and/or other operations. In some embodiments, gradient EM field analysis and other operations of the computer system 40 are automated. Additionally or alternatively, at least some operations of the computer system 40 may involve user input or verification.

In at least some embodiments, the computer system 40 includes a processing unit 42 that performs gradient EM field analysis and related operations by executing software or instructions obtained from a local or remote non-transitory computer-readable medium 48. The computer system 40 also may include input device(s) 46 (e.g., a keyboard, mouse, touchpad, etc.) and output device(s) 44 (e.g., a monitor, printer, etc.). Such input device(s) 46 and/or output device(s) 44 provide a user interface that enables an operator to interact with the gradient EM measurement tool 26 and/or software executed by the processing unit 42. For example, the computer system 40 may enable an operator may select gradient EM field analysis options, to view collected gradient EM field analysis data, to view gradient EM field analysis results, to view directional drilling options, and/or to perform other tasks.

In at some embodiments, processing unit 42 of computer 40 determines the distance and/or direction between the gradient EM measurement tool 26 and the EM transmitter 37 by performing an inversion algorithm based on rules or laws governing EM fields. The inversion algorithm may be based on deterministic and/or stochastic methods of optimization. Advantageously, the inversion can be performed based on measurements collected at a single measured depth position (i.e., there is no need to move the transient EM measurement tool 26). Further, the processing unit 42 can determine the distance or direction of the EM transmitter relative to the gradient sensor arrangement without performing a source strength calibration.

Figure 2:
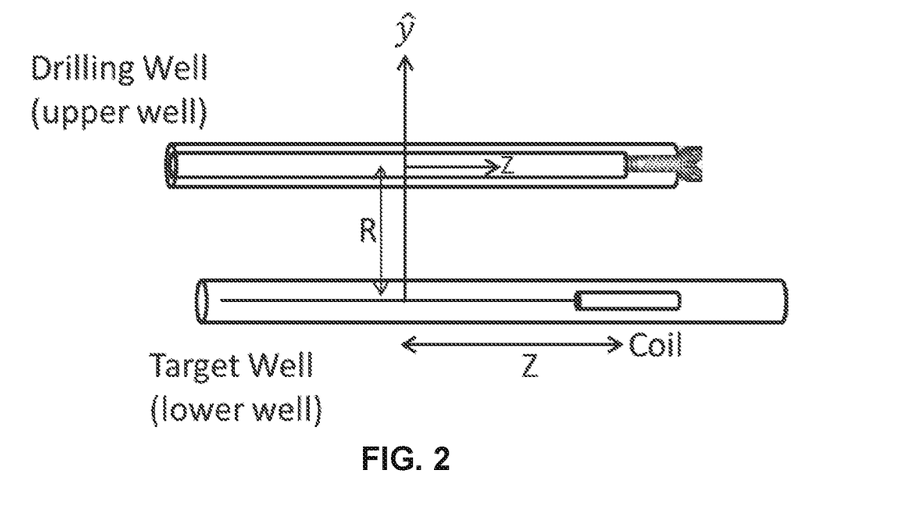
FIG. 2 is a schematic diagram showing two wells and position parameters.
Figure 3:
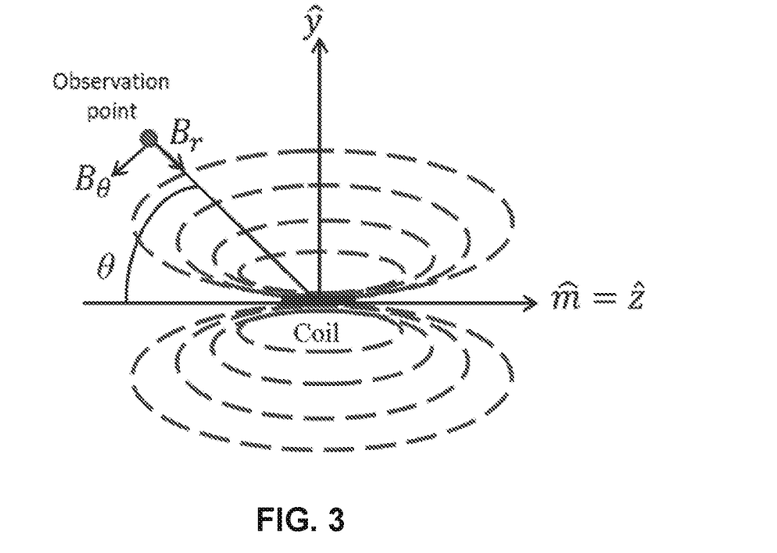
FIG. 3 is a schematic diagram showing a magnetic dipole and orientation parameters.

To facilitate discussing example gradient EM field analysis operations, FIGS. 2 and 3 introduce relevant parameters regarding the orientation of two wells and an observation point involved in a ranging operation. More specifically, FIG. 2 shows two wells oriented along a direction Z and separated by a lateral distance, R. The $\hat{y}$ direction in FIG. 2 is orthogonal to the Z direction. Meanwhile, FIG. 3 shows an observation point relative to a coil or solenoid (i.e., an EM transmitter) having a direction $\hat{m}$ that is aligned with direction $\hat{z}$. The angle between the coil and the observation point is $\theta$, and the $\hat{y}$ direction in FIG. 3 is orthogonal to both $\hat{m}$ and $\hat{z}$. The magnetic field B corresponding to the observation point has two components, $B_\theta$ and $B_r$.

The magnetic field of a coil carrying current can be characterized by two magnetic poles separated by the tool length. The magnetic fields of the coil are well described by an idealized magnetic dipole of moment m. The magnetic field $\vec{B}(\vec{r})$ of by the magnetic dipole pointing in the direction $\hat{m}$ and having strength of m Weber meters at the observation point r is:

$$\vec{B}(\vec{r}) = 3\frac{(\vec{m}.\vec{r})\vec{r}}{r^5} - \frac{\vec{m}}{r^3} \qquad (1)$$

The field component in the radial direction and in the azimuthal direction at the observation point is given by:

$$B_r = 2\frac{m}{4\pi r^3}\cos\theta \qquad (2a)$$

$$B_\theta = \frac{m}{4\pi r^3}\sin\theta \qquad (2b)$$

In Cartesian coordinates (x,y,z), the y- and z-components of the magnetic field are given by:

$$B_y = \frac{3m}{4\pi r^3}\sin\theta\cos\theta = \frac{3m(z/R)}{4\pi R^3\left[1+(z/R)^2\right]^{5/2}} \qquad (3a)$$

$$B_z = \frac{m}{4\pi r^3}(2\cos^2\theta - 1) = \frac{m\left[2(z/R)^2 - 1\right]}{4\pi R^3\left[1+(z/R)^2\right]^{5/2}} \qquad (3b)$$

To determine the lateral distance, R, between two wells, one can measure the field at two points along the lateral direction (y-axis). Let us define the ratio $B_y/B_z$ which can be found from equations as:

$$B_y/B_z = \frac{3(z/R)}{[2(z/R)^2 - 1]} \quad (4)$$

Equation (4) can be solved for z/R [3]:

$$z/R = \frac{3}{4(B_y/B_z)}\left[1 \pm \sqrt{1 + \frac{8}{9}(B_y/B_z)^2}\right] \equiv A \quad (5)$$

Assume two sensors of a gradient sensor arrangement are separated by a fix distance of $\Delta S$ along direction R for a single measured depth, z. The two sensors will measure the axial and lateral field components and will define the value of $z/R_1$ and $z/R_2$ based on equation (5). Then, the ratio $R_2/R_1$ can be determined as:

$$\frac{R_2}{R_1} = \frac{A_1}{A_2} \quad (6)$$

where $R_2-R_1=\Delta S (R_1=R-\Delta S/2, R_2=R+\Delta S/2)$. Now by solving equations (5) and (6), lateral distance R between the wells can be calculated by:

$$R = \frac{\frac{A_1}{A_2}+1}{\frac{A_1}{A_2}-1}\Delta S/2 \quad (7)$$

When the sensors are exactly above the coil (means when z=0), then, $B_y$=0. In that case, the distance can be calculated only based on the $B_z$ (axial components) of the sensors:

$$R = \frac{\sqrt[3]{\left(\frac{B_{z1}}{B_{z2}}\right)}+1}{\sqrt[3]{\left(\frac{B_{z1}}{B_{z2}}\right)}-1}\Delta S/2 \quad (8)$$

Figure 4A:
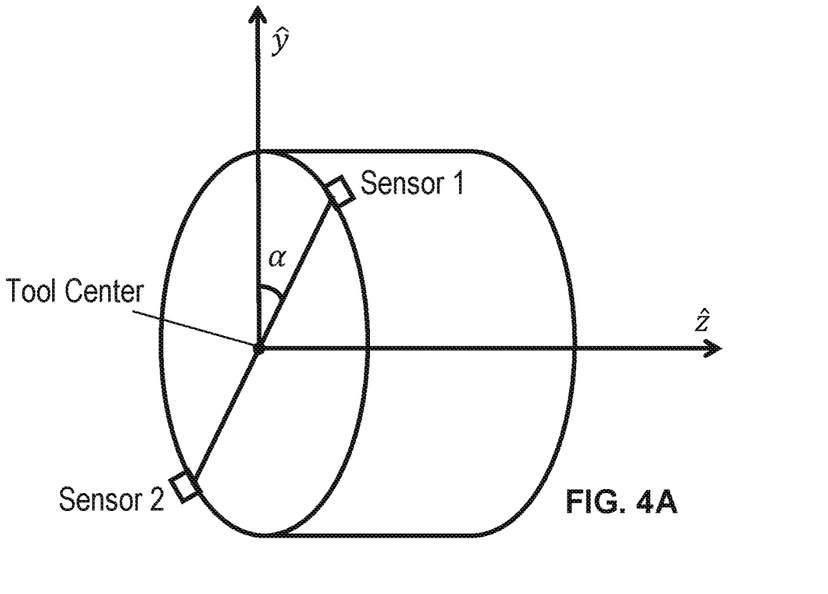
FIGS. 4A and 4B are schematic diagrams showing illustrative gradient sensor arrangement options.

In the above example, it is assumed that both sensors are located along the y-axis. However, in reality, the tool face (e.g., a reference point of the gradient EM measurement tool 26) and thus a (see FIG. 4A) varies while drilling. If sensor 1 does not lie on a straight line between the target well and the tool center (meaning tool face α in FIG. 4A is not zero), then Eq. (7) and Eq. (8) are not valid anymore. The tool face α will affect field strength and direction. Without taking this angle α into consideration, the conventional gradient calculation will fail to calculate accurate ranging distance.

To account for the angle effect discussed above, assume sensor 1 makes the angle α with lateral direction (y). For simplicity, assume two spaced sensors are oriented 180° away from each other in a gradient EM measurement tool (e.g., tool 26). Taking the angle into calculation, the equation will be modified as below:

$$\frac{R_2}{R_1} = \frac{R + \Delta S/2 \cos \alpha}{R - \Delta S/2 \cos \alpha} \quad (9)$$

Solving the equation (9) for R will give:

$$R = \frac{\frac{R_2}{R_1}+1}{\frac{R_2}{R_1}-1}\frac{\Delta S}{2}\cos \alpha \quad (10)$$

where $$\frac{R_1}{R_2}$$

can be substituted by eq. (6) and R can be calculate as:

$$R = \frac{\frac{A_1}{A_2}+1}{\frac{A_1}{A_2}-1}\frac{\Delta S}{2}\cos \alpha \quad (11)$$

Note that the angle α can be easily calculated by measuring both components at sensor 1.

It should be noted that at least two measurements at two different positions along the y direction are needed. Otherwise, when the tool face angle α=90, both sensors are at the same y, and R cannot be calculated (see equation (11)). To avoid this blind angle, a gradient sensor arrangement may include at least three spaced sensors. This way, the distance can be calculated for all the tool face angles.

Figure 4B:
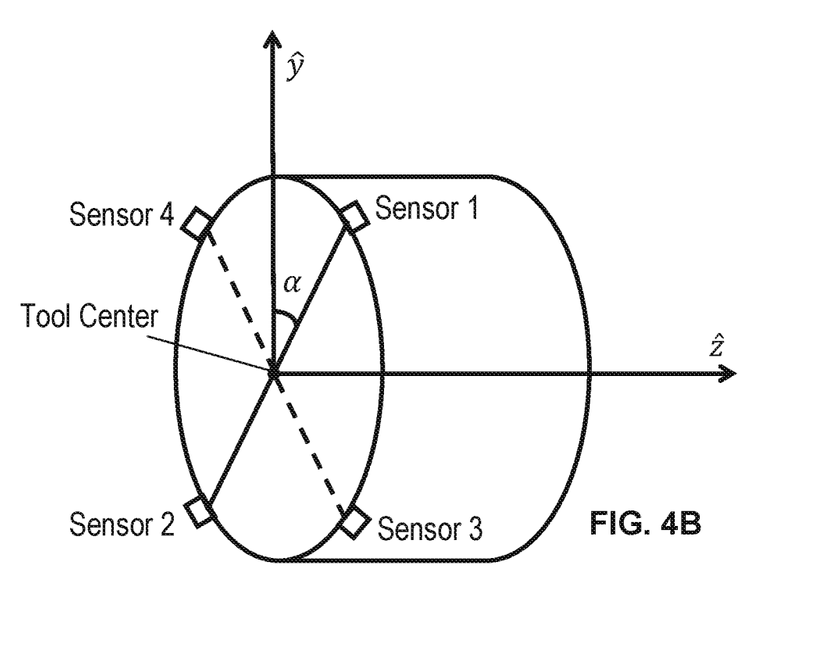

In the embodiments of FIG. 4B, the gradient sensor arrangement represented includes two pairs of sensors such that each sensor is oriented 90° away from each other. More specifically, sensor 1 and sensor 2 are oppositely spaced relative to an axis (or tool center) and correspond to a first pair. Further, sensor 3 and sensor 4 are oppositely spaced relative to an axis (or tool center) and correspond to a second pair, where sensor 3 and sensor 4 are offset from sensor 1 and sensor 2 by 90°. When one pair (e.g., sensor 1 and sensor 2) is in the blind spot, the other pair (e.g., sensor 3 and sensor 4) is in a suitable position to collect measurements, and vice versa. Accordingly, in at least some embodiments, a comparison of the EM field gradient between sensor 1 and sensor 2 and the EM field gradient between sensor 3 and sensor 4 may be performed. For example, the pair with the largest EM field gradient may be selected. If there is an EM field gradient for both pairs, one or both gradients may be used to determine the distance and/or directions information. Multiple gradients may also be used to identify the tool face angle (assuming the position of each sensor is known).

Figure 5A:
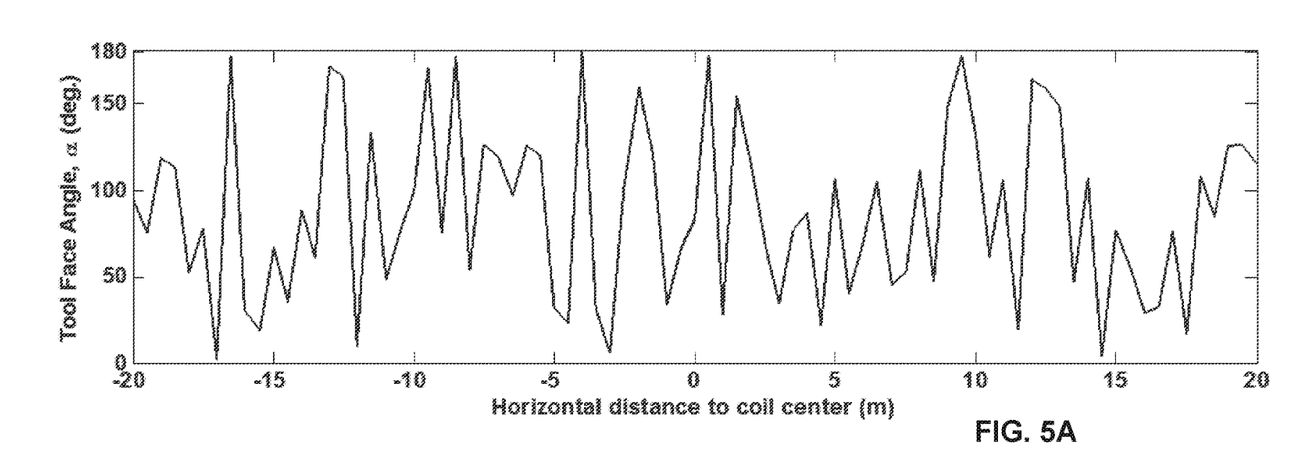
FIGS. 5A and 5B are graph showing magnetic field measurements as a function of tool face angle and distance between wells.
Figure 5B:
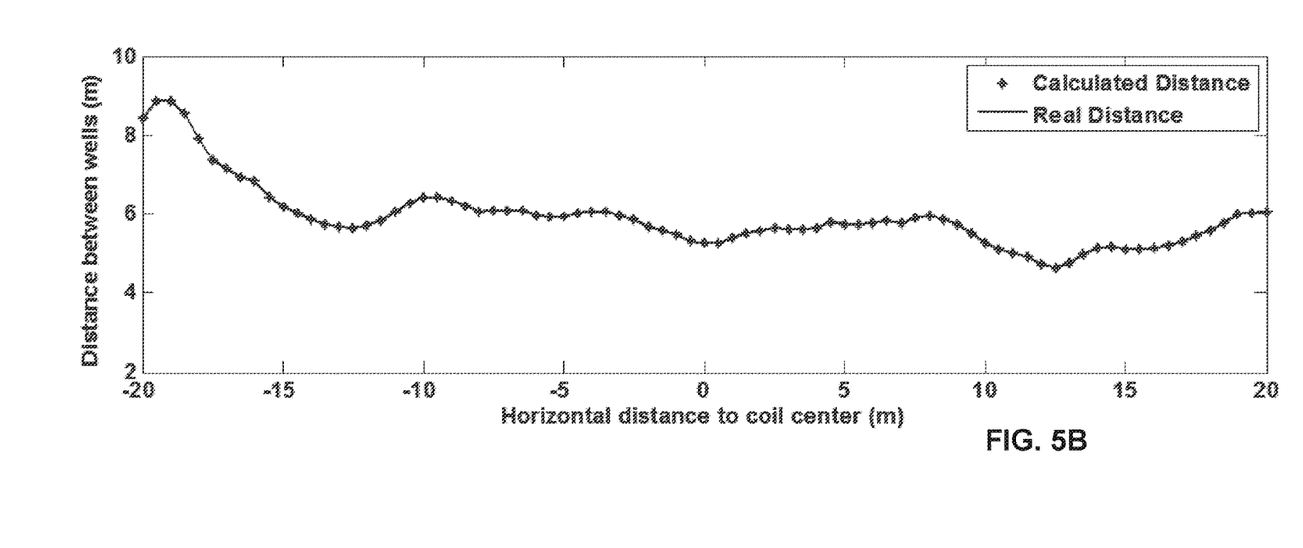

In an example scenario, an EM transmitter is deployed in the target well and a gradient sensor arrangement is deployed in the well being drilled. The sensors of the gradient sensor arrangement include in a pair separated by $\Delta S$=0.1 m. The pair of sensors measures the magnetic field at different lateral points in a single depth and then the distance between the wells will be calculated based on the equations discussed above. FIGS. 5A and 5B show the distance calculation between the wells in this scenario. For the plotted data of FIGS. 5A and 5B, different tool face angles were considered and an accurate distance calculation has been achieved.

Figure 6:
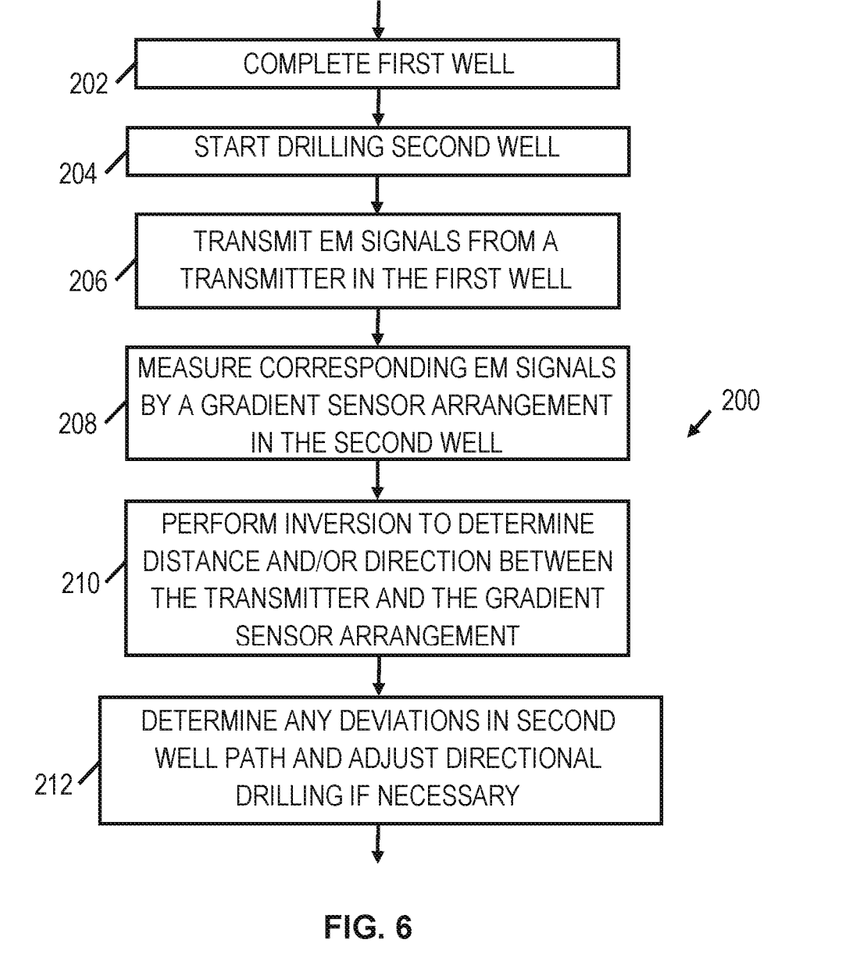
FIG. 6 is a flowchart showing an illustrative ranging method involving a gradient sensor arrangement.

FIG. 6 is flowchart showing an illustrative method 200 involving a gradient sensor arrangement for ranging. In at least some embodiments, the method 200 comprises completing a first well (the target well) at block 202. At block 204, drilling of a second well is started. At block 206, EM signals are transmitted from a transmitter in the first well. At block 208, corresponding EM signals are measured by a gradient sensor arrangement in the second well. At block 210, an inversion is performed to determine distance and/or direction between the transmitter and the gradient sensor arrangement or a related point of reference. At block 212, any deviations in the second well path are determined based on the distance and/or direction information, and directional drilling is adjusted as needed. In at least some embodiments, blocks 206, 208, 210, and 212 can be repeated until drilling of the second well is complete. In an alternative embodiment, EM signals can be transmitted from a transmitter in the second well (the well being drilled), while corresponding EM signals are measured by a gradient sensor arrangement in the first well (the target well).

Embodiments disclosed herein include:

A: A system that comprises a gradient sensor arrangement deployed in a first borehole, the gradient sensor arrangement having a plurality of spaced sensors at a single measured depth position. The system also comprises an EM transmitter deployed in a second borehole. The system also comprises a processor configured to determine a distance or direction of the EM transmitter relative to the gradient sensor arrangement based on EM field measurements collected by the gradient sensor arrangement in response to an EM field emitted by the EM transmitter. The system also comprises a directional drilling controller configured to update a trajectory for either the first borehole or the second borehole in response to the determined distance or direction.

B. A method that comprises deploying a gradient sensor arrangement in a first borehole, the gradient sensor arrangement having a plurality of spaced sensors at a single measured depth position. The method also comprises deploying an EM transmitter in a second borehole. The method also comprises determining a distance or direction of the EM transmitter relative to the gradient sensor arrangement based on EM field measurements collected by the gradient sensor arrangement in response to an EM field emitted by the EM transmitter. The method also comprises updating a trajectory for either the first borehole or the second borehole in response to the determined distance or direction.

Each of the embodiments, A and B, may have one or more of the following additional elements in any combination. Element 1: wherein the gradient sensor arrangement is part of a BHA and wherein the EM transmitter is deployed in a target well. Element 2: wherein the gradient sensor arrangement is deployed in a target well and the EM transmitter is part of a BHA. Element 3: wherein the gradient sensor arrangement comprises at least three spaced sensors that enable distance or direction to be determined for all tool face angles. Element 4: wherein the gradient sensor arrangement comprises a first pair of sensors that are oppositely spaced relative to an axis, and a second pair of sensors that are oppositely spaced relative to the axis. Element 5: wherein the EM transmitter comprises a solenoid. Element 6: wherein the EM transmitter is part of a downhole tool deployed via wireline, slickline, or coiled tubing. Element 7: wherein the processor calculates a difference between EM field measurements corresponding to different sensors of the gradient sensor arrangement to determine distance or direction of the EM transmitter relative to the gradient sensor arrangement. Element 8: wherein the processor determines the distance or direction of the EM transmitter relative to the gradient sensor arrangement using only EM field measurements collected at the single measured depth position. Element 9: wherein the processor determines the distance or direction of the EM transmitter relative to the gradient sensor arrangement without performing a source strength calibration.

Element 10: wherein the gradient sensor arrangement is deployed as part of a BHA and wherein the EM transmitter is deployed in a target well. Element 11: wherein the gradient sensor arrangement is deployed in a target well and the EM transmitter is deployed as part of a BHA. Element 12: wherein the gradient sensor arrangement comprises at least three spaced sensors that enable distance or direction to be determined for all tool face angles. Element 13: wherein the gradient sensor arrangement comprises a first pair of sensors that are oppositely spaced relative to an axis, and a second pair of sensors that are oppositely spaced relative to the axis. Element 14: wherein the EM transmitter comprises a solenoid. Element 15: wherein the EM transmitter is deployed as part of a downhole tool via wireline, slickline, or coiled tubing. Element 16: further comprising calculating a difference between EM field measurements corresponding to different sensors of the gradient sensor arrangement to determine distance or direction of the EM transmitter relative to the gradient sensor arrangement. Element 17: wherein determining the distance or direction of the EM transmitter relative to the gradient sensor arrangement involves only EM field measurements collected at the single measured depth position. Element 18: wherein determining the distance or direction of the EM transmitter relative to the gradient sensor arrangement does not involve a source strength calibration.

Numerous variations and modifications will become apparent to those skilled in the art once the above disclosure is fully appreciated. The methods and systems can be used for directional drilling and/or for other operations that rely on tracking position of a downhole object relative to a reference position or target position. The ensuing claims are intended to cover such variations where applicable.

What is claimed is:

1. A system that comprises:
   a gradient sensor arrangement deployed in a first borehole, the gradient sensor arrangement having a plurality of spaced sensors, wherein the plurality of spaced sensors are disposed radially from a longitudinal axis of a downhole tool;
   an electromagnetic (EM) transmitter deployed in a second borehole;
   a processor configured to determine a distance or direction of the EM transmitter relative to the gradient sensor arrangement based on EM field measurements collected by the gradient sensor arrangement in response to an EM field emitted by the EM transmitter; and
   a directional drilling controller configured to update a trajectory for either the first borehole or the second borehole in response to the determined distance or direction.

2. The system of claim 1, wherein the gradient sensor arrangement is part of a bottomhole assembly (BHA) and wherein the EM transmitter is deployed in a target well.

3. The system of claim 1, wherein the gradient sensor arrangement is deployed in a target well and the EM transmitter is part of a bottomhole assembly (BHA).

4. The system of claim 1, wherein the gradient sensor arrangement comprises at least three spaced sensors that enable distance or direction to be determined for all tool face angles.

5. The system of claim 4, wherein the gradient sensor arrangement comprises a first pair of sensors that are oppositely spaced relative to an axis, and a second pair of sensors that are oppositely spaced relative to the axis.

6. The system according to any one of claims 1 to 5, wherein the EM transmitter comprises a solenoid.

7. The system according to any one of claims 1 to 5, wherein the EM transmitter is part of a downhole tool deployed via wireline, slickline, or coiled tubing.

8. The system according to any one of claims 1 to 5, wherein the processor calculates a difference between EM field measurements corresponding to different sensors of the gradient sensor arrangement to determine distance or direction of the EM transmitter relative to the gradient sensor arrangement.

9. The system according to any one of claims 1 to 5, wherein the processor determines the distance or direction of the EM transmitter relative to the gradient sensor arrangement using only EM field measurements collected at the single measured depth position.

10. The system according to any one of claims 1 to 5, wherein the processor determines the distance or direction of the EM transmitter relative to the gradient sensor arrangement without performing a source strength calibration.

11. A method that comprises:
deploying a gradient sensor arrangement in a first borehole, the gradient sensor arrangement having a plurality of spaced sensors, wherein the plurality of spaced sensors are disposed radially from a longitudinal axis of a downhole tool;
deploying an electromagnetic (EM) transmitter in a second borehole;
determining a distance or direction of the EM transmitter relative to the gradient sensor arrangement based on EM field measurements collected by the gradient sensor arrangement in response to an EM field emitted by the EM transmitter; and
updating a trajectory for either the first borehole or the second borehole in response to the determined distance or direction.

12. The method of claim 11, wherein the gradient sensor arrangement is deployed as part of a bottomhole assembly (BHA) and wherein the EM transmitter is deployed in a target well.

13. The method of claim 11, wherein the gradient sensor arrangement is deployed in a target well and the EM transmitter is deployed as part of a bottomhole assembly (BHA).

14. The method of claim 1, wherein the gradient sensor arrangement comprises at least three spaced sensors that enable determining the distance or direction for all tool face angles.

15. The method of claim 14, wherein the gradient sensor arrangement comprises a first pair of sensors that are oppositely spaced relative to an axis, and a second pair of sensors that are oppositely spaced relative to the axis.

16. The method according to any one of claims 11 to 15, wherein the EM transmitter comprises a solenoid.

17. The method according to any one of claims 11 to 15, wherein the EM transmitter is deployed as part of a downhole tool via wireline, slickline, or coiled tubing.

18. The method according to any one of claims 11 to 15, further comprising calculating a difference between EM field measurements corresponding to different sensors of the gradient sensor arrangement to determine distance or direction of the EM transmitter relative to the gradient sensor arrangement.

19. The method according to any one of claims 11 to 15, wherein determining the distance or direction of the EM transmitter relative to the gradient sensor arrangement involves only EM field measurements collected at the single measured depth position.

20. The method according to any one of claims 11 to 15, wherein determining the distance or direction of the EM transmitter relative to the gradient sensor arrangement does not involve a source strength calibration.

* * * * *